Figure 1:
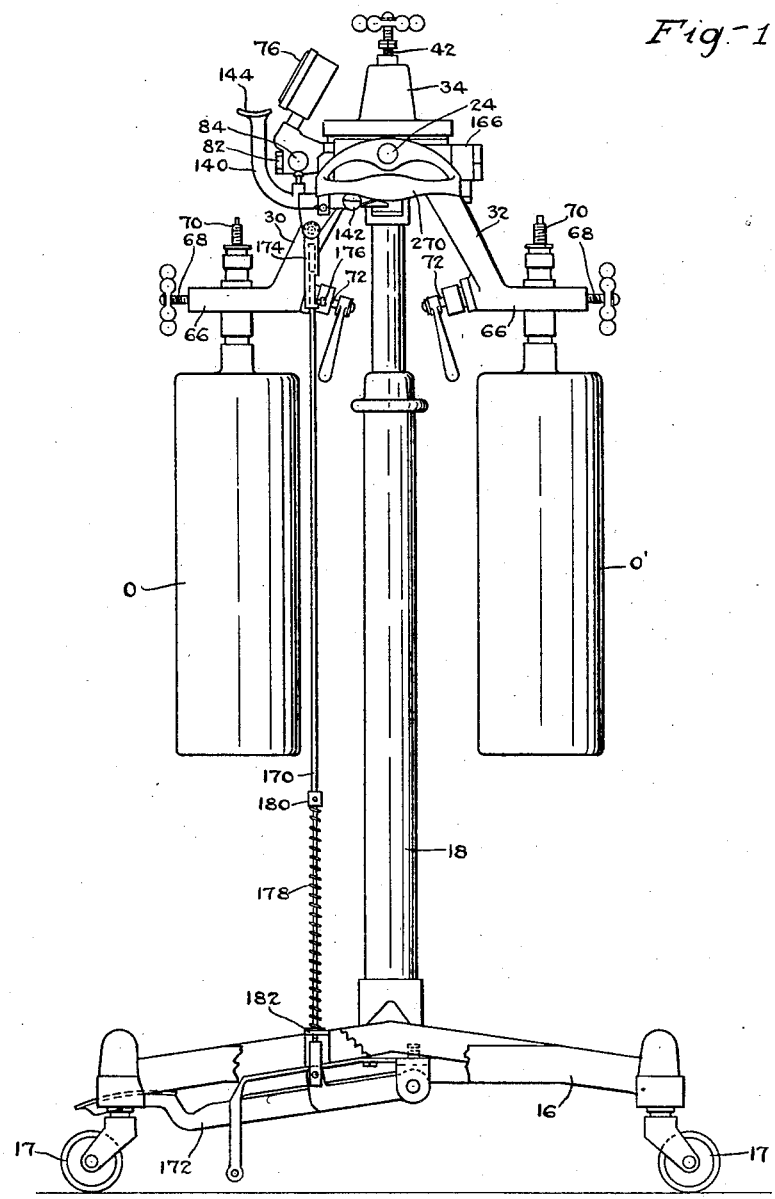

April 28, 1931. J. A. HEIDBRINK 1,802,601
ANÆSTHETIZING APPARATUS
Filed May 2, 1927 7 Sheets-Sheet 1

Inventor:
Jay A. Heidbrink.
By Whiteley and Ruckman
Attorneys.

April 28, 1931. J. A. HEIDBRINK 1,802,601
ANÆSTHETIZING APPARATUS
Filed May 2, 1927 7 Sheets-Sheet 3

Inventor:
Jay A. Heidbrink
By Whiteley
and Ruckman
Attorneys.

April 28, 1931. J. A. HEIDBRINK 1,802,601
ANÆSTHETIZING APPARATUS
Filed May 2, 1927 7 Sheets-Sheet 5

Inventor:
Jay A. Heidbrink
By Whiteley and Ruckman
Attorneys.

April 28, 1931.  J. A. HEIDBRINK  1,802,601
ANÆSTHETIZING APPARATUS
Filed May 2, 1927  7 Sheets-Sheet 6

Inventor:
Jay A. Heidbrink.
By Whiteley and Ruckman
Attorneys.

April 28, 1931. J. A. HEIDBRINK 1,802,601
ANÆSTHETIZING APPARATUS
Filed May 2, 1927 7 Sheets-Sheet 7
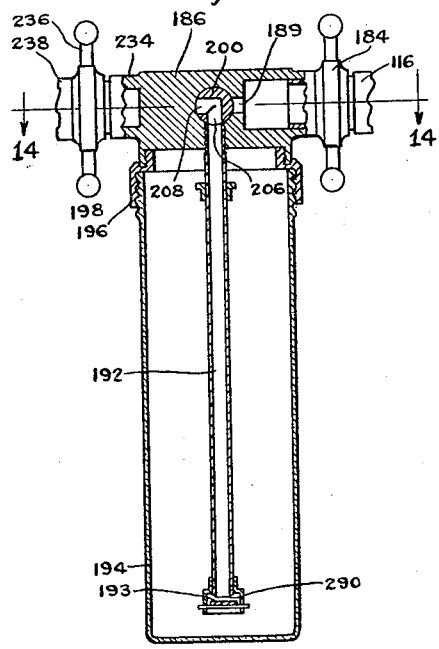
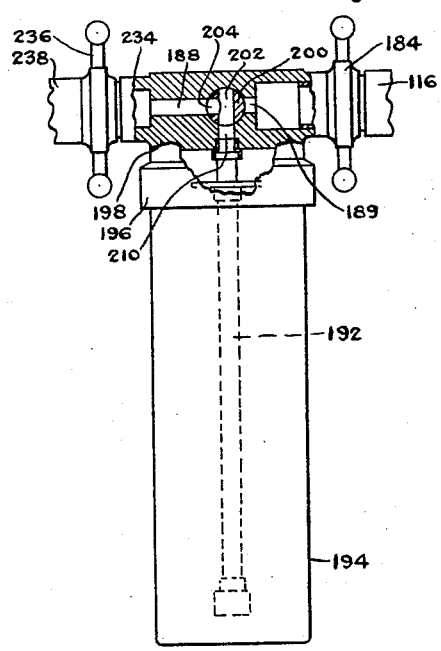
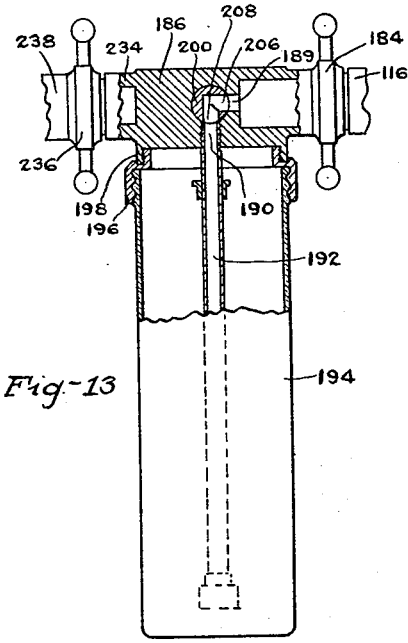
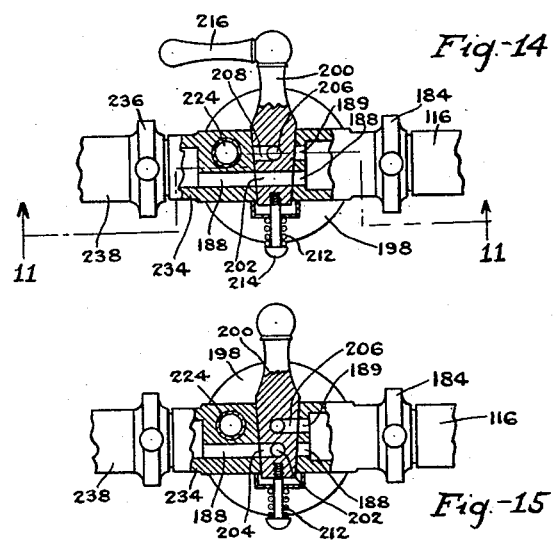
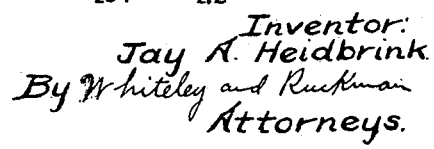
Inventor:
Jay A. Heidbrink
By Whiteley and Ruckman
Attorneys.

Patented Apr. 28, 1931

1,802,601

UNITED STATES PATENT OFFICE

JAY A. HEIDBRINK, OF MINNEAPOLIS, MINNESOTA

ANÆSTHETIZING APPARATUS

Application filed May 2, 1927. Serial No. 188,376.

My invention relates to anæsthetizing apparatus and an object in general is to provide an improved apparatus for administering a mixture of gases for producing anæsthesia or partial anæsthesia, known as analgesia. One of the objects of the invention is to provide a plurality of units each of which embodies means for controlling the delivery of one of the gases, the units being so corelated that while a small number of units may be used, the number can be readily increased according to the number of different gases which it is desired to administer.

Another object is to provide a construction for at least some of the units by means of which the quantity of gas such as oxygen passing therethrough may be very quickly increased so that the patient is in effect given a shot of such gas. Another object is to provide an improved construction by means of which any one of a plurality of gases may be administered singly if desired and by means of which a mixture of any two or more of the different gases in any desired proportion may be administered at the same time. Another object is to provide means for automatically shutting off the supply of gases if the pressure thereof under which they are being supplied to the patient becomes excessive. Another object is to provide an etherizer attachment in the combination whereby ether may at any time be introduced into the mixture of gases or shut off therefrom. Another object is to provide a rebreathing bag attachment in the combination so arranged that communication with the bag may be either established or shut off as desired and also so arranged that the supply of gas and communication with the bag may both be shut off at the same time.

The full objects and advantages of my invention will appear in connection with the detailed description thereof, and the novel features of my inventive idea will be particularly pointed out in the claims.

In the accompanying drawings which illustrate a practical embodiment of my invention,—

Figure 2:
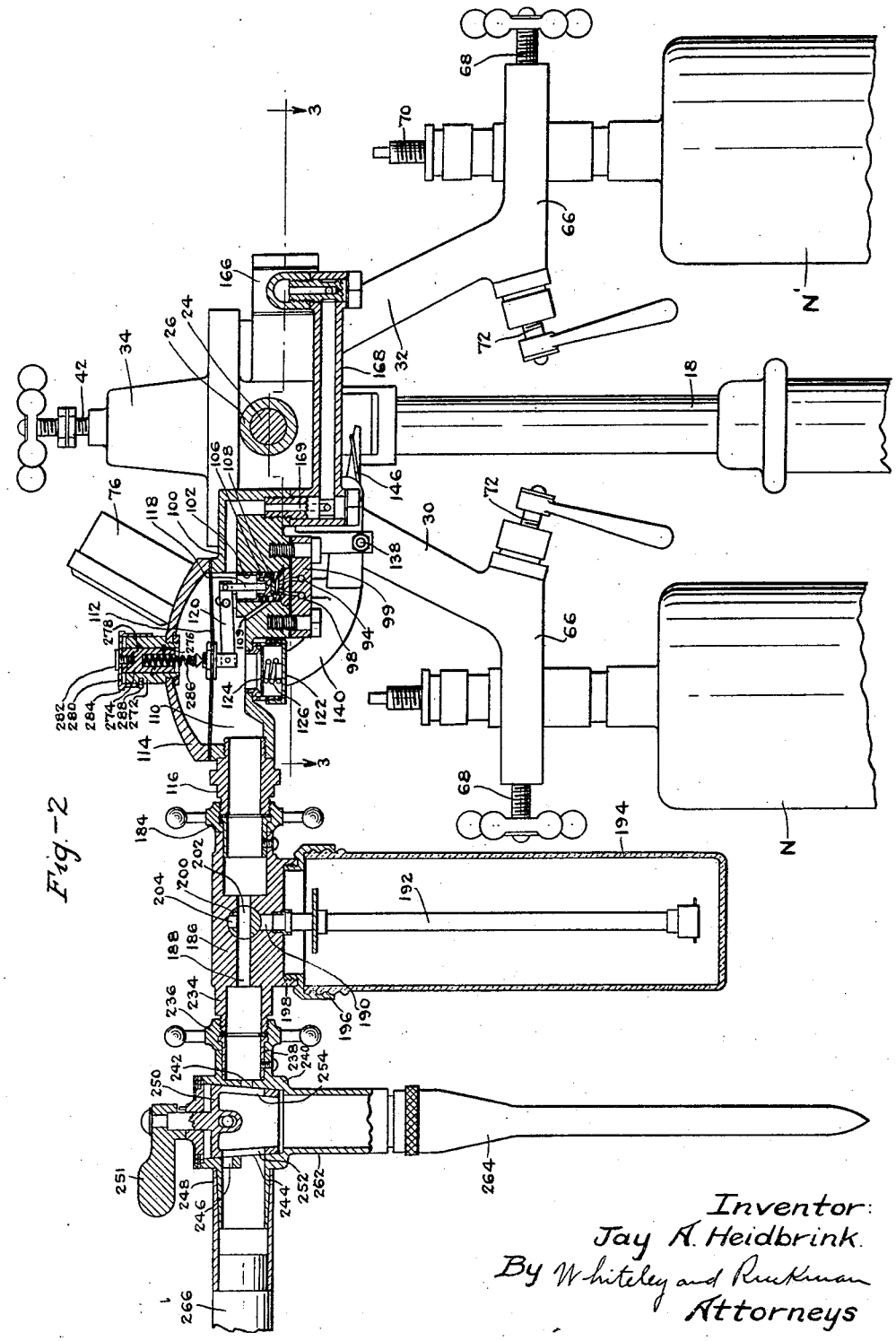
Figure 3:
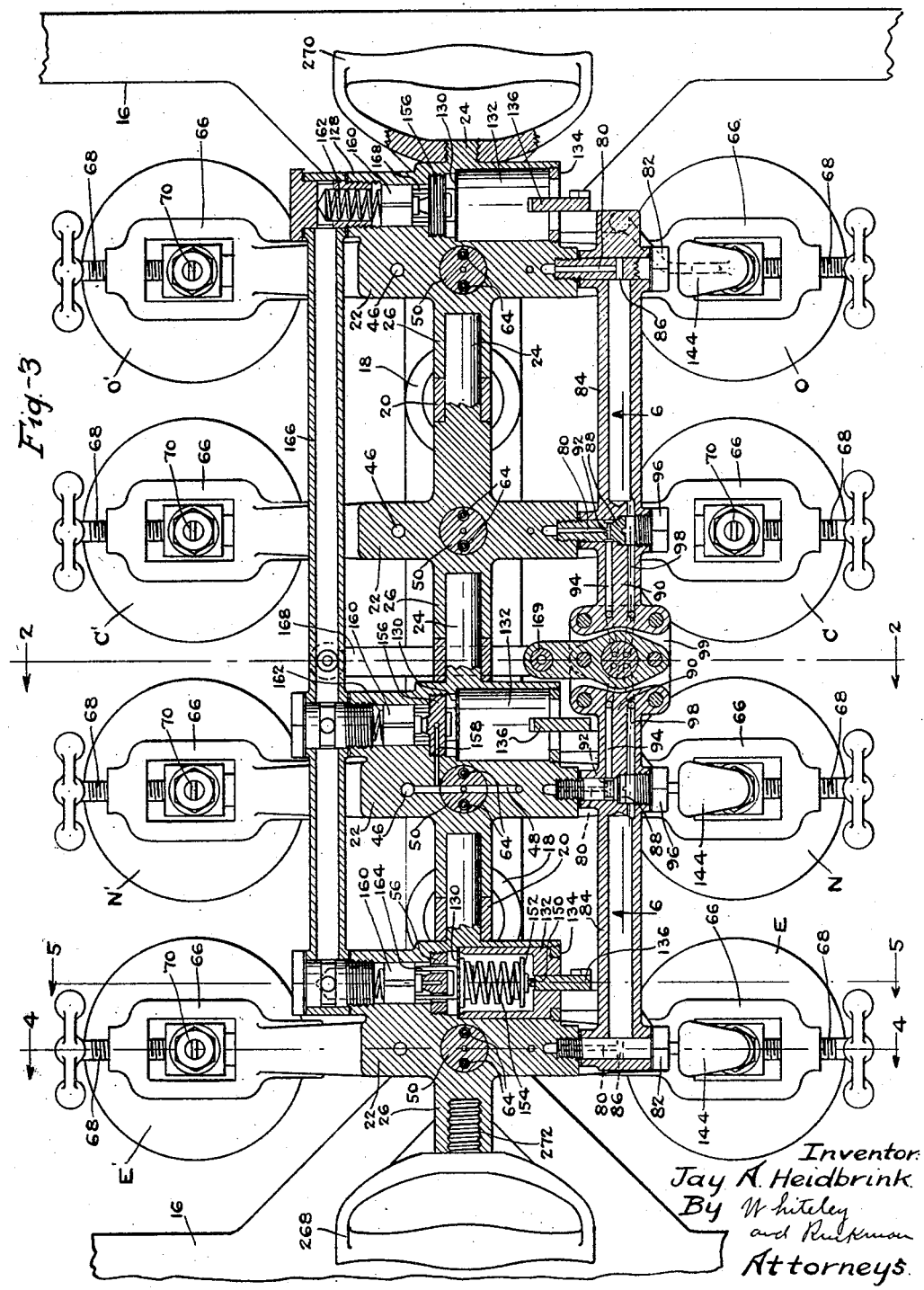
Figure 4:
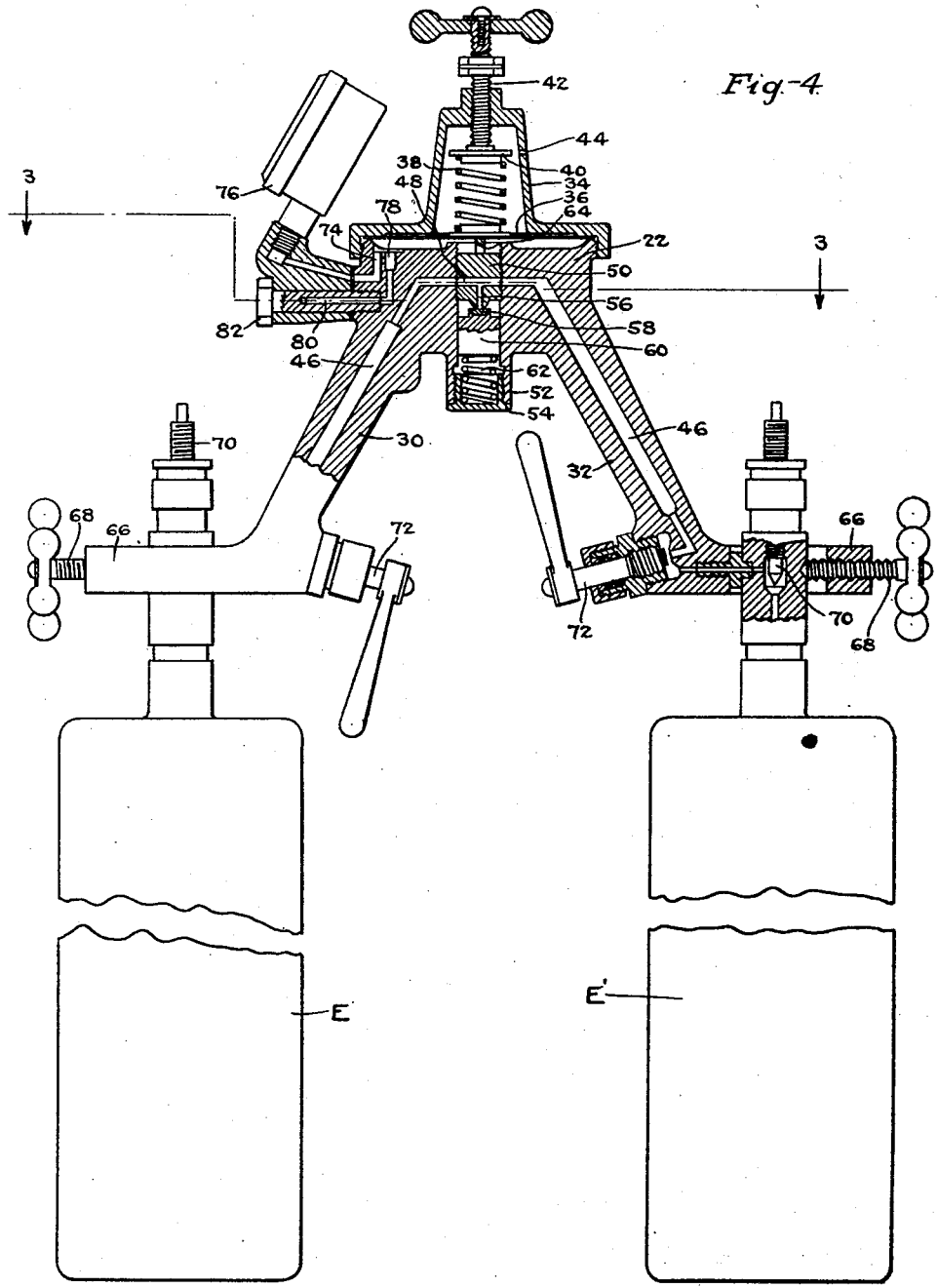
Figure 5:
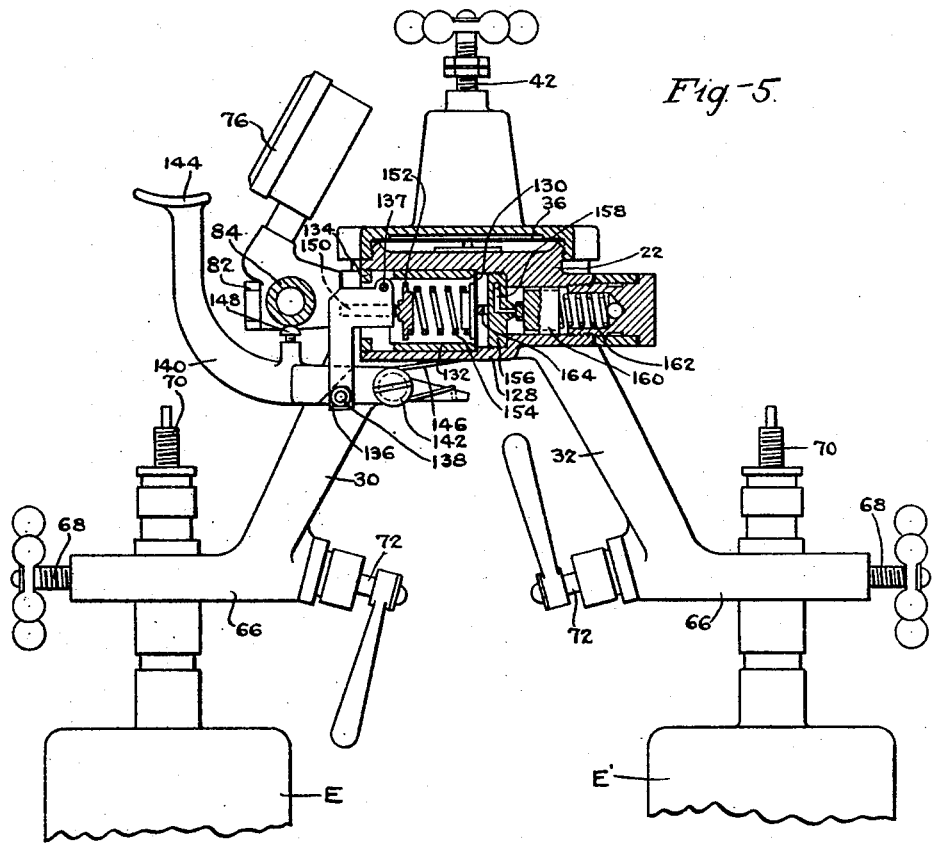
Figure 6:
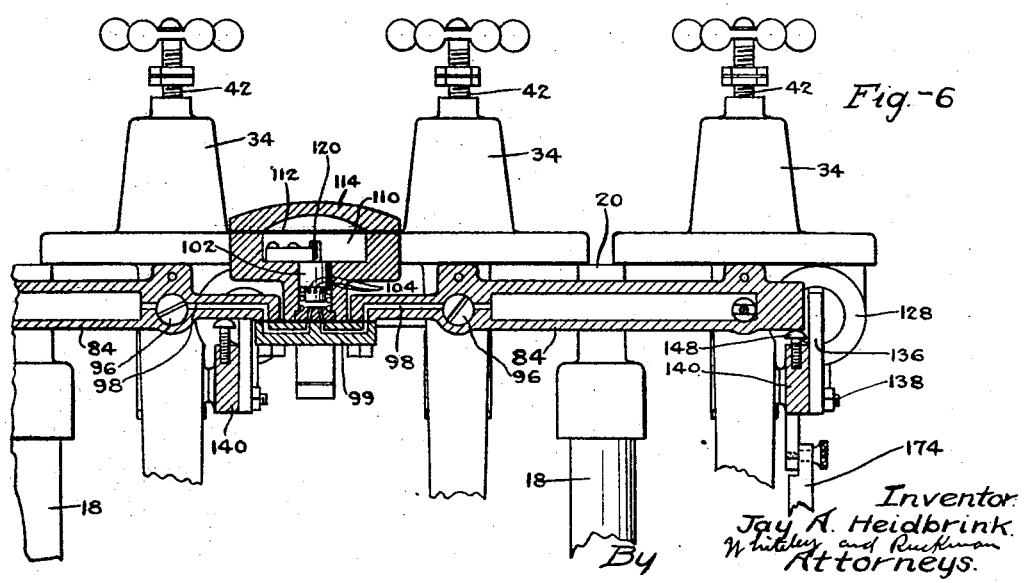
Figure 7:
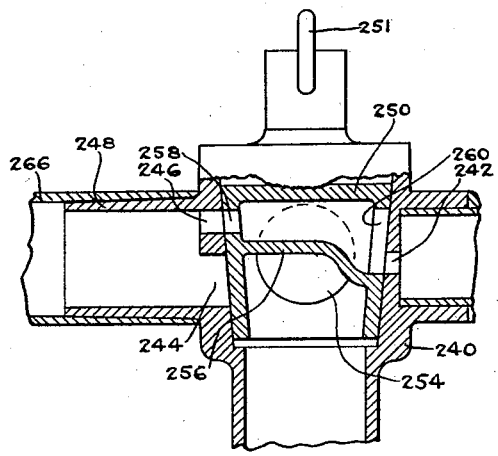
Figure 8:
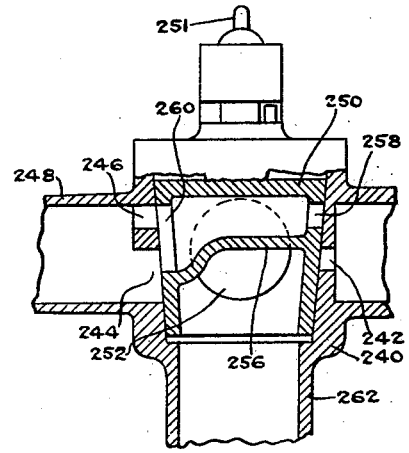
Figure 9:
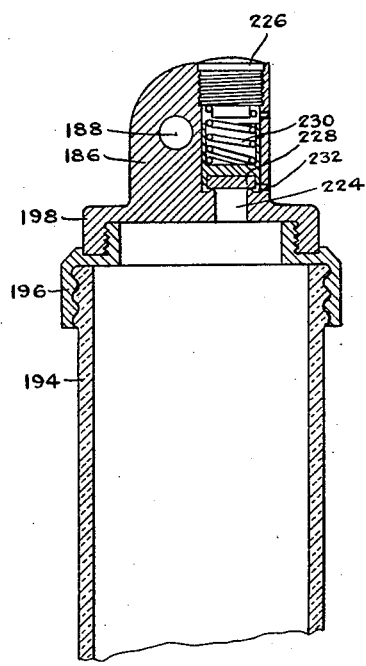
Figure 10:
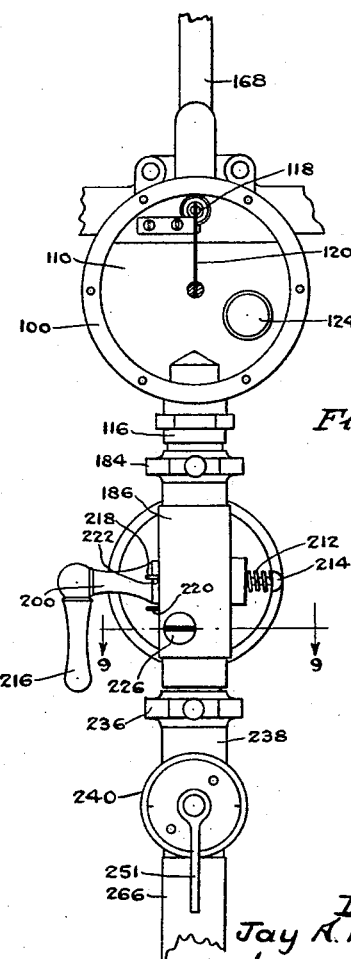

Fig. 1 is an end elevational view of the apparatus. Fig. 2 is a view in vertical section on the line 2—2 of Fig. 3. Fig. 3 is a view in horizontal section on the line 3—3 of Fig. 2 and of Fig. 4. Fig. 4 is a view in vertical section on the line 4—4 of Fig. 3. Fig. 5 is a view in vertical section on the line 5—5 of Fig. 3. Fig. 6 is a view in vertical section on the line 6—6 of Fig. 3. Fig. 7 is a view in vertical section through a shut-off valve. Fig. 8 is a similar view showing a shut-off valve turned through 180°. Fig. 9 is a view in section on the line 9—9 of Fig. 10. Fig. 10 is a top plan view of the central portion of the apparatus with a cover and a diaphragm removed. Fig. 11 is a view in section on the line 11—11 of Fig. 14 showing an etherizer attachment. Fig. 12 is a sectional view showing some of the parts in a different position, the section being taken a little ahead of that on which Fig. 11 is taken. Fig. 13 is a view similar to Fig. 11 showing some of the parts in a still different position. Fig. 14 is a view in section on the line 14—14 of Fig. 11. Fig. 15 is a view similar to Fig. 14 but showing the valve turned through 90°.

As shown in the drawings, I provide a suitable base 16 mounted on caster wheels 17 as shown in Fig. 1. Standards 18 extend up from the base and the upper ends of these standards carry ringlike members 20 as shown in Figs. 3 and 6. A plurality of castings 22 are held together in tandem relation by means of rodlike extensions 24 on one side of the castings which extend into sockets 26 formed on the other side of the castings, the extensions being held in the sockets in any suitable manner. Two of the rodlike members extend through the rings 20 as shown in Fig. 3 in order to support the head of the apparatus upon the standards 18. The shape of the castings 22 is best shown in Fig. 4 from which it will be understood that they are of an inverted V-shape in cross-section with divergent branches 30 and 32 and cupshaped upper surfaces formed by threaded peripheries upon which are screwed caps 34 which hold diaphragms 36 with their peripheries clamped upon the cup members. Compression springs 38 engage the upper surfaces of the diaphragms and also engage blocks 40 which in turn are engaged by hand screws 42 threaded through the upper ends of the caps 34 whereby any desired degree of pressure may be exerted upon the diaphragms which are sealed from atmosphere on their lower sides but are open to atmosphere on their upper sides through openings 44 in the caps. The castings 22 including both branches thereof are hollow to provide chambers 46 which include passages 48 formed in plugs 50 threaded into the central portions of the castings which below the plugs 50 are provided with tubular extensions 52 whose lower ends are closed by screw plugs 54. Central openings 56 extend from the passages 48 down through the lower portions of the plugs 50 and the lower ends of these openings are adapted to be closed by valves consisting of fiber plugs 58 carried by the upper ends of blocks 60 slidably mounted in the tubular extensions 52 and normally held upward by coiled springs 62. Staplelike members 64 engage the lower surfaces of the diaphragms 36 and the two arms of these staplelike members extend down loosely through perforations in the plugs 50 and engage the upper surfaces of the slidable blocks 60. It is obvious that the pressure of the gas passing down through the openings 56 may be minutely controlled by turning the screws 42 since the blocks 60 will be forced downwardly upon turning these screws in a downward direction. As best shown in Fig. 4, the branches 30 and 32 of the castings are deflected outwardly at their lower ends to provide yoke members 66 in which the necks of containers which will be referred to presently are secured by screws 68. The openings in the necks of the containers may be closed by needle valves 70 which when unscrewed allow passage of gas from the containers through passages in the sides of the neck into passageways leading into the chambers 46 as will be seen from Fig. 4, the latter passageways being controlled by hand operated valves 72. It is obvious that by operating the valves 70 and 72, the pair of containers associated with each casting may be interchangeably used so that when one container is exhausted, another one containing the same kind of gas is always ready for use. Any suitable gases may be used and by the employment of the proper number of castings in tandem, the number of different gases may be increased to any desired extent. In the particular embodiment shown for illustrative purposes, the apparatus is arranged to deliver four different gases and beginning at the left in Fig 3, the containers E and E' are for ethylene, the containers N and N' are for nitrousoxid, the containers C and C' are for carbondioxid, and the containers O and O' are for oxygen. As shown in Fig. 4, the passageway from the container E' is open since the valves 70 and 72 have been unscrewed the proper amount and it will be understood that the passageways for any of the other containers may be similarly opened by unscrewing the valves associated therewith. When this is done, the gases pass into the chambers 46 from which they pass down through the openings 56, the pressure being regulated by the setting of the hand screws 42 and the parts controlled thereby. From the outlet of the openings 56, the gases pass up through the openings which are partly occupied by the branches of the staplelike members 64 and then pass into the spaces underneath the diaphragms 36. From these spaces, the gases pass through perforations 74 into passageways connected respectively with pressure gauges 76, and the gases also pass into passageways 78 in the castings 22 connecting with passageways 80. The passageway 80 for ethylene gas is formed in a bolt 82 and the passageway 80 for oxygen is formed in a similar bolt 82, these bolts having their inner ends screwed into the proper castings 22. The bolts 82 are used only in connection with the two end castings and these bolts pass through tubular members 84 extending longitudinally at the front of the head. The passageways 80 in the bolts 82 connect with transverse passageways 86 therein which lead into the tubular members 84. For the intermediate castings which support the containers for nitrous oxid and carbon dioxid, the passageways 80 are formed in screws 88 which are screwed into the castings and whose heads engage partitions 90 formed in the tubular members 84. The passageways 80 in the screws 88 lead into transverse passageways 92 which connect with passageways 94 formed at the rear side of the partitions 90. The screws 88 are introduced through openings in the tubular members 84, these openings being closed by short screw bolts 96 which stop short of the heads of the screws 88 so that passages are provided for the ethylene and oxygen into passageways 98 formed in front of the partitions 90. The passageways 94 and 98 connect with perforations in the bottom member 99 of a casing 100 constituting part of an automatic gas controlling device. These perforations lead into a cylindrical recess with which the casing 100 is provided, this recess containing a cupshaped plunger 102, the lower end of which is reduced and is provided with a plurality of perforations 104 as shown in Fig. 6. The plunger 102 is normally held up from the bottom of the recess by a coiled spring 106 and the lower end of the plunger carries a piece of rubber 108 as shown in Fig. 2 which closes the perforations in the bottom when the plunger is depressed. When the plunger is in its normal raised position, the gases pass through the perforations 104 or as shown in Fig. 2 through a passageway 109 into a chamber 110 below a diaphragm 112 held in place in the casing by a cover 114 secured thereto. From the chamber 110, the thoroughly mixed gases pass out through a threaded pipe section 116. The plunger 102 is attached to the lower end of a rod 118 whose upper end is pivoted to one end of a lever 120 whose other end is attached to the diaphragm 112. If the pressure of gas in the chamber 110 exceeds a predetermined amount, the diaphragm is lifted and the plunger 102 is depressed, thereby shutting off the flow of gases from the passageways 94 and 98 until the pressure in the chamber 110 becomes normal. A relief device is also provided for the chamber 110, this device consisting of a casing 122 as shown in Fig. 2 containing a valve 124 normally held closed by a spring 126. When the pressure of gas overcomes the tension of this spring, the valve opens and gas escapes from the chamber past the valve.

The structure which has already been described, provides for delivery of the proper amounts of gas under ordinary conditions. However, conditions sometimes arise which make it advisable to quickly and greatly increase the amount of one or more of the gases being delivered to the patient. This feature does not apply to the carbon dioxid but does for the other gases in connection with the embodiment herein shown. Therefore, I have shown means for this purpose in connection with the delivery of ethylene, nitrous oxid and oxygen. The castings through which these gases are supplied have attached thereto rounded hollow extensions 128 containing shoulders against which diaphragms 130 are held by thimbles 132 secured in place by screw rings 134 at the front. The thimbles 132 contain slots at their front edges in which elbow members 136 are pivotally mounted at 137 as shown in Fig. 5, the lower ends of these members having lateral projections 138 which engage underneath hand levers 140 pivoted at 142 and having finger pieces 144 by which they may be depressed. The hand levers are normally held up by springs 146 and are provided with screws 148 which constitute adjustable stops for engagement with the members 84 to limit the upper position of the hand levers. The elbow members 136 carry pins 150 which engage in depressions formed in disks 152 while coiled springs 154 are interposed between the latter and the diaphragms 130. Disks 156 are secured in the extensions 128 being spaced somewhat from the rear side of the diaphragms 130. These disks are provided with passageways 158 connecting with the gas chambers 46 as will be understood in connection with the nitrous oxid unit in Fig. 3 and opening through the rear side of the disks as shown in Fig. 5. The passageways 158 are normally closed at their rear ends by sliding blocks 160 held against such ends by coiled springs 162. Staplelike members 164 engage the rear surfaces of the diaphragms 130 and the branches of these members extend loosely through perforations in the disk 156 so as to engage the slidable blocks 160. The latter are longitudinally grooved so that when the finger pieces 144 are depressed, gas will be released from the particular gas chamber selected and pass into a manifold tube 166 which is in communication with the interior of the rear portion of the extensions 128 and supported by the latter. The tube 166 is connected by a tube 168 with a hollow bolt 169 leading into the chamber 110 of the automatic gas controlling device as will be understood from Fig. 2. The result is that a comparatively large charge of the gas selected by depression of one of the hand levers 140 may be caused to pass through the discharge pipe 116 regardless of the fact that the fiber disk 158 may be depressed at this time so that the ordinary passage of gases is blocked. The relief device 122 prevents the pressure of gas in the chamber 110 from becoming excessive.

In the use of some of the gases particularly oxygen, it sometimes happens that the operator is using both of his hands at the time when he wishes to produce a shot of such gas. Therefore, in connection with the unit for supplying oxygen, I have in Fig. 1 shown in addition to the hand-operated means, foot-operated means for obtaining this result. A rod 170 is attached at its lower end to a foot pedal 172 pivoted to the base 16. The upper end of this rod telescopes in a hollow member 174 which is pivotally attached to the hand lever 140. A screw 176 secured to the rod 170 works in a slot in the member 174 so that the hand lever may be depressed without moving the rod 170, but when the rod 170 is pulled downwardly, the engagement of the screw 176 with the lower end of the slot in the member 174 causes the hand lever and the parts associated therewith to be actuated. A spring 178 coiled around the lower portion of the rod 170 between a shoulder 180 thereon and a lug 182 carried by the base causes the rod to move upwardly when released.

The delivery pipe 116 may be connected in any suitable manner with an inhaler for supplying the gases to the patient. I have shown means by which either vapor may be supplied to the patient along with the gases. As shown in Fig. 2, the pipe section 116 is connected by a coupling 184 to a valve casing 186 having a horizontal passageway 188 therethrough and a port 189 extending in from the inlet end of the casing to a chamber for a valve which will be described presently. A vertical passageway 190 extends downwardly from the valve chamber and the lower end of this vertical passageway is fitted with a tube 192 having a disk float 193 in an enlargement at the bottom. This tube extends down into an ether receptacle 194 connected by a coupling 196 with a circular flange 198 extending down from the valve casing 186. The valve chamber previously referred to is provided with a rotary valve 200 which has a passageway 202 therethrough adapted to register with the passageway 188 as shown in Figs. 2 and 14. From the passageway 202, a port 204 extends at 90° thereto. As will be apparent from Figs. 11, 13, 14, and 15, the valve 200 is also provided with two ports 206 and 208 positioned at 90° from each other and meeting each other in the longitudinal axis of the valve. It will be understood that the passageway 190 shown in Fig. 13 is directly below the port 206 when the valve is in the position shown in Fig. 14. The valve casing is provided with a second vertical passageway 210 extending down from the valve chamber and parallel to the vertical passageway 190 to which the tube 192 is fitted. The manner in which the ports 202 and 204 may be made to register with the passageway 210 will be understood by comparing Fig. 12 with Figs. 14 and 15. As will be apparent from Figs. 14 and 15, the valve 200 is tapered and is held in the valve chamber by a coiled spring 212 surrounding a screw 214 whose end is threaded into the end of the valve. The other end of the valve is provided with a handle 216 by which it may be turned. As will be apparent from Fig. 10, the valve casing 186 is provided with pins 218 and 220 positioned 90° from each other and adapted to be engaged by a pin 222 extending out from the valve. When the pin 222 is in engagement with the pin 218, the handle 216 extends horizontally and when the pin 222 is in engagement with the pin 220, the handle extends downwardly, the turning movement of the valve being limited to 90° by the pins. In the horizontal position of the handle, which is that shown in Figs. 2 and 14, the passageway 202 of the valve is in alinement with the passageway 188 of the valve casing and the gases pass straight through the valve casing. At this time, the port 189 of the casing is not open to any passageway in the valve as will be understood from Figs. 11 and 14. When the handle 216 extends straight down, the passage of gas directly through the passageway 188 is blocked and the ports 206 and 208 are in communication with the port 189. Gas now passes through these ports down the tube 192 and bubbles up through the ether carrying vapor therefrom up through the vertical passageway 210 into the passageway 202 and out through the port 204 into the passageway 188 of the valve casing. In order to prevent excessive pressure in the receptacle 194, the valve casing 186 is furnished with a relief device. For this purpose, the valve casing is provided with a vertical perforation 224 the upper end of which is closed by a screw plug 226. A valve 228 shown in Fig. 9 is normally held on its seat by a coiled spring 230 interposed between the valve and the plug. When the valve is lifted from its seat, gas is permitted to escape through a small perforation 232.

In order to provide for the employment of a rebreathing bag, the valve casing 186 has a tubular extension 234 which is connected by a coupling 236 with a tubular extension 238 from a valve casing 240 having a port 242 on its supply side and two ports 244 and 246 on its delivery side, these ports opening into a tubular extension 248. The valve chamber of this casing is provided with a rotatable hollow valve 250 having a handle 251 attached to its upper end and having an open lower end. As shown in Fig. 2, the valve 250 is provided with ports 252 and 254 in its diametrically opposite sides. The upper portion of the interior of this valve is provided with a hollow curved lug 256 providing a chamber in the top portion of the valve. The wall of this chamber on one side is provided with an ordinary port 258 and at the diametrically opposite side is provided with a vertically elongated port 260, the latter port extending down further than the former which feature is permitted by the curvature of the lug 256. When this valve is in its normal position shown in Fig. 2, the gas passes directly through the valve by means of the ports 252 and 254. The open lower end of the valve is at this time in communication with a depending tubular extension 262 to which a rebreathing bag 264 is attached. In this position of the valve, the rebreathing bag functions in the customary manner. When the valve is turned 90° into the position shown in Fig. 7, gas passes through the ports 242, 260, 258, and 246 but communication with the bag 264 is shut off by the lug 256. When the valve is turned 90° from normal position in the other direction into the position shown in Fig. 8, the flow of gas is shut off and communication with the bag is also shut off. It will be understood that the tubular extension 248 from the valve casing is connected by a tube 266 with an inhaler of any suitable construction and not shown.

As best shown in Fig. 3, the ends of the head of the apparatus are provided with handles 268 and 270 to facilitate handling thereof. The handle 268 carries a threaded stem adapted to be screwed into the socket member 26 of the lefthand casting, the socket being provided with internal threads for this purpose. The handle 270 is provided with a screw-threaded hole which receives the rod-like extension 24 of the right hand casting, this extension being cut down and threaded for this purpose. It is, therefore, apparent that the two end castings may be cast exactly like the casting shown for use with nitrogen, it being merely necessary afterward to provide the socket member 26 with internal threads for one end casting and to cut down and externally thread the extension 24 for the other end casting so that the handles may be attached. Even this slight machining may be dispensed with and other provision made for attachment of handles or the handles omitted although in such case, the head could not be as conveniently handled. The construction is such that as many castings as desired like that shown in use for nitrogen may be coupled together in case it is desired to increase the number of gases which may be employed. It is to be understood as a matter of course that the tubular members 84 and 166 would be varied as necessary according to the number of castings employed.

It is to be noted that Fig. 2 of the drawings shows the cover 114 of the automatic gas controlling device as being provided with the following means for regulating the pressure at which the diaphragm 112 will flex to shut off the supply of gas. A sleeve 272 is secured to the cover 114 and a plug 274 is mounted for movement therein. A pin 276 secured to this plug engages a spiral groove 278 formed in the interior wall of the sleeve. A cap 280 is secured to the upper end of the plug 274 by a screw 282 and this cap has a knurled periphery 284 by means of which it may be rotated together with the plug 274. A coiled spring 286 has its upper end placed in a recess in the plug and its lower end engaged with the diaphragm 112. By turning the plug to move it downwardly, the spring will be placed under tension and the amount of gas pressure required to operate the shut off will be increased. In order to limit the turning movement of the cap 280 and keep the gas pressure within determined limits, the depending flange of the cap is partly cut away and the cut out portion receives a stop pin 288 which is secured to the sleeve 272.

The operation and advantages of my invention had already to a large extent been set forth. While I have shown four units assembled for delivering four different gases, it will be understood that since the castings 22 are arranged in tandem and have interengaging means by which they may be attached one after the other, the number of units for the delivery of different gases may be varied as desired. It will also be understood that any one of the gases alone may be administered by shutting down the units which control the remainder of the gases and that a mixture of any two or more of the different gases may be obtained by shutting down the units which control the gases which it is not desired to administer at the particular time. It will be understood that when the rebreathing bag is receiving exhalations from the patient, that pressure caused thereby in the ether receptacle will lift the disk 193 into engagement with the sharpened lower end 290 of the tube 192 and prevent the forcing of gas back into the automatic gas controlling device so that the operation of the latter is not disturbed.

I claim:

1. An anæsthetizing apparatus comprising a plurality of sources of gas supply, a plurality of members containing chambers adapted for connection with said sources respectively, a mixing chamber, two sets of passageways connecting said first mentioned chambers at different points respectively with said mixing chamber, devices for minutely and separately controlling the passage of gas through one of said sets of passageways, a valve device cooperating with said passageways, means normally holding said valve from closing said passageways, a diaphragm constituting one of the walls of said mixing chamber, connections between said diaphragm and valve device whereby the latter is moved into closing position when the pressure of gas in said mixing chamber exceeds a predetermined amount, valves normally closing the other of said sets of passageways, and devices separately under the control of the operator for opening said valves to permit the sudden passage of a large amount of gas through the selected one of the last mentioned sets of passageways when the aforesaid valve device is both open and closed.

2. An anæsthetizing apparatus comprising a plurality of sources of gas supply, a plurality of members containing chambers adapted for connection with said sources respectively, a mixing chamber, two sets of passageways connecting said first mentioned chambers respectively with said mixing chamber, devices for minutely and separately controlling the passage of gas through one of said sets of passageways, hollow extensions carried by said members, disks secured in said extensions between the ends thereof, said disks containing portions of said passageways which open on the rear sides thereof, valves normally held against said sides to close the openings therethrough, diaphragms in front of said disks, connections between said diaphragms and said valves, levers normally held in upward position, and connections between said levers and said diaphragm whereby when said levers are depressed said valves are opened to permit the passage of a large amount of gas through the selected one of the last mentioned sets of pasageways.

In testimony whereof I hereunto affix my signature.

JAY A. HEIDBRINK.